US010554749B2

(12) United States Patent
Amit et al.

(10) Patent No.: US 10,554,749 B2
(45) Date of Patent: *Feb. 4, 2020

(54) CLIENTLESS SOFTWARE DEFINED GRID

(71) Applicant: INTERNATIONAL BUSINESS MACHINES CORPORATION, Armonk, NY (US)

(72) Inventors: Jonathan Amit, Omer (IL); Lior Chen, Jerusalem (IL); Michael Keller, Haifa (IL); Rivka M. Matosevich, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/569,316

(22) Filed: Dec. 12, 2014

(65) Prior Publication Data
US 2016/0173598 A1 Jun. 16, 2016

(51) Int. Cl.
G06F 15/167 (2006.01)
H04L 29/08 (2006.01)

(52) U.S. Cl.
CPC ...... H04L 67/1097 (2013.01); H04L 67/1002 (2013.01)

(58) Field of Classification Search
CPC .................. H04L 67/1097; H04L 67/1002
USPC .......................................................... 709/213
See application file for complete search history.

(56) References Cited

U.S. PATENT DOCUMENTS

| 6,973,549 B1 | 12/2005 | Testardi |
| 7,103,638 B1 | 9/2006 | Borthakur et al. |
| 7,636,801 B1 | 12/2009 | Kekre et al. |
| 8,190,784 B1 * | 5/2012 | Raizen ................. G06F 3/0604 710/105 |
| 8,627,446 B1 | 1/2014 | Eaton et al. |
| 8,826,032 B1 | 9/2014 | Yahalom et al. |
| 9,058,122 B1 | 6/2015 | Nesbit et al. |
| 9,294,558 B1 | 3/2016 | Vincent et al. |

(Continued)

OTHER PUBLICATIONS

Alba et al., "Efficient and Agile Storage Management in Software Defined Environments" 12 pages, IBM Journal of Research and Development, vol. 58, No. 2/3, Paper 5, Mar./May 2014.

(Continued)

Primary Examiner — Brian Whipple
Assistant Examiner — Hannah S Wang
(74) Attorney, Agent, or Firm — Griffiths & Seaton PLLC

(57) ABSTRACT

Methods, computing systems and computer program products implement embodiments of the present invention that include configuring multiple servers coupled to a network as a software defined storage (SDS) grid. A first given server receives, via the network, an input/output (I/O) request from a host computer, and determines a location of data associated with the I/O request. In some embodiments, each of the servers maintains a local grid data map that store locations for all data managed by the SDS grid. Upon identifying, in its respective local grid data map, that a second given server is configured to process the I/O request, the first given server forwards the I/O request to the second given server for processing, and upon receiving a result of the I/O request from the second given server, the first given server conveys the result of the I/O request to the host computer.

12 Claims, 3 Drawing Sheets

(56) References Cited

U.S. PATENT DOCUMENTS

| | | |
|---|---|---|
| 9,384,227 B1 | 7/2016 | Xiao et al. |
| 9,521,198 B1 | 12/2016 | Agarwala et al. |
| 9,563,517 B1 | 2/2017 | Natanzon et al. |
| 2004/0098537 A1 | 5/2004 | Serizawa |
| 2004/0103261 A1 | 5/2004 | Honda et al. |
| 2004/0143637 A1 | 7/2004 | Koning et al. |
| 2004/0193795 A1 | 9/2004 | Takeda et al. |
| 2004/0210724 A1 | 10/2004 | Koning et al. |
| 2004/0215792 A1 | 10/2004 | Koning et al. |
| 2004/0225719 A1 | 11/2004 | Kisley et al. |
| 2005/0076154 A1 | 4/2005 | Chambliss et al. |
| 2006/0010341 A1 | 1/2006 | Kodama |
| 2006/0026069 A1 | 2/2006 | Frank |
| 2006/0029069 A1 | 2/2006 | Frank et al. |
| 2006/0101196 A1* | 5/2006 | Urmston ........... G06F 16/90339 711/108 |
| 2006/0143350 A1 | 6/2006 | Miloushev et al. |
| 2006/0242380 A1 | 10/2006 | Korgaonkar et al. |
| 2007/0234116 A1 | 10/2007 | Yoshikawa et al. |
| 2007/0288494 A1 | 12/2007 | Chrin et al. |
| 2008/0126525 A1 | 5/2008 | Ueoka et al. |
| 2008/0281908 A1 | 11/2008 | McCanne et al. |
| 2009/0019157 A1 | 1/2009 | Suman et al. |
| 2009/0059862 A1 | 3/2009 | Talagala et al. |
| 2009/0132543 A1 | 5/2009 | Chatley et al. |
| 2009/0168784 A1 | 7/2009 | Nakamura et al. |
| 2009/0177860 A1 | 7/2009 | Zhu et al. |
| 2010/0088335 A1* | 4/2010 | Mimatsu ................ H04L 67/06 707/770 |
| 2010/0153415 A1 | 6/2010 | Muntz |
| 2010/0199036 A1 | 8/2010 | Siewert |
| 2011/0047195 A1 | 2/2011 | Le et al. |
| 2011/0055477 A1 | 3/2011 | Hara et al. |
| 2011/0138136 A1 | 6/2011 | Shitomi et al. |
| 2011/0145448 A1 | 6/2011 | Gordon |
| 2011/0208979 A1 | 8/2011 | Saarinehn et al. |
| 2011/0271010 A1 | 11/2011 | Kenchammana et al. |
| 2012/0011176 A1 | 1/2012 | Aizman |
| 2012/0030415 A1 | 2/2012 | Selfin et al. |
| 2012/0072540 A1* | 3/2012 | Matsuzawa ......... H04L 67/1097 709/219 |
| 2012/0278584 A1 | 11/2012 | Nagami et al. |
| 2013/0046949 A1 | 2/2013 | Colgrove et al. |
| 2013/0145105 A1 | 6/2013 | Sawicki et al. |
| 2013/0246580 A1 | 9/2013 | Ozawa et al. |
| 2013/0290399 A1 | 10/2013 | Gordon |
| 2014/0040212 A1 | 2/2014 | Yochai et al. |
| 2014/0082145 A1 | 3/2014 | Lacapra |
| 2014/0115579 A1 | 4/2014 | Kong |
| 2014/0156719 A1 | 6/2014 | Leggette et al. |
| 2014/0173018 A1 | 6/2014 | Westphal et al. |
| 2014/0201425 A1 | 7/2014 | Clark et al. |
| 2014/0244937 A1 | 8/2014 | Bloomstein et al. |
| 2014/0317206 A1 | 10/2014 | Lomelino et al. |
| 2014/0330921 A1 | 11/2014 | Storm et al. |
| 2014/0337391 A1 | 11/2014 | Starovoitov et al. |
| 2015/0071123 A1 | 3/2015 | Sabaa |
| 2015/0110116 A1 | 4/2015 | Gong |
| 2015/0263978 A1 | 9/2015 | Olson et al. |
| 2015/0288680 A1 | 10/2015 | Leggette |
| 2016/0057224 A1 | 2/2016 | Ori |
| 2016/0072886 A1 | 3/2016 | Lin et al. |
| 2016/0072889 A1 | 3/2016 | Jung et al. |
| 2016/0094461 A1 | 3/2016 | Shetty et al. |
| 2016/0098225 A1* | 4/2016 | Huang .................. G06F 3/0635 711/154 |
| 2016/0112516 A1 | 4/2016 | Liu et al. |
| 2016/0132699 A1* | 5/2016 | Miller ..................... G06F 21/80 713/193 |
| 2016/0139838 A1 | 5/2016 | D'Sa |

OTHER PUBLICATIONS

Xiang-Lin et al., "Performance Analysis of an iSCSI-based Unified Storage Network" pp. 1-7, Journal of Zhejiang University Science vol. 5, No. 1, Jan. 2004.

Seshadri et al., "Software Defined Just-in-Time Caching in an Enterprise Storage System" 13 pages, IBM Journal of Research and Development, vol. 58, No. 2/3, Paper 7, Mar./May 2014

* cited by examiner

CLIENTLESS SOFTWARE DEFINED GRID

FIELD OF THE INVENTION

The present invention relates generally to software defined storage, and specifically to a method for accessing data stored in a software defined storage grid.

BACKGROUND

Software-defined storage (SDS) is a computer data storage technology that separates storage hardware from the software that manages the storage infrastructure. By definition, SDS software is separate from the hardware it is managing.

Grid storage is a computer data storage technology that stores data using multiple self-contained interconnected storage nodes (i.e., servers), so that any node can communicate with any other node without the data having to pass through a centralized node.

One advantage of grid storage systems is that its data distribution scheme offers a level of load balancing, fault-tolerance and redundancy across the system. It implies that if one storage node fails or if a pathway between two nodes is interrupted, the network can reroute data access via a different path or to a redundant node. In operation, SDS can implement a grid storage system to span data across multiple servers.

The description above is presented as a general overview of related art in this field and should not be construed as an admission that any of the information it contains constitutes prior art against the present patent application.

SUMMARY

There is provided, in accordance with an embodiment of the present invention a method, including configuring multiple servers coupled to a network as a software defined storage (SDS) grid, receiving, by a first given server, an input/output (I/O) request, and upon identifying that a second given server is configured to process the I/O request, forwarding the I/O request to the second given server.

There is also provided, in accordance with an embodiment of the present invention a data facility, including a network, one or more host computers coupled to the network, and multiple servers coupled to the network, and configured as a software defined storage (SDS) grid, each of the servers including multiple storage devices, and a processor configured to receive at a receiving server, from a given host computer, an input/output (I/O) request, and upon identifying that a given server, different from the receiving server is configured to process the I/O request, to forward the I/O request to the given server.

There is further provided, in accordance with an embodiment of the present invention a computer program product, the computer program product including a non-transitory computer readable storage medium having computer readable program code embodied therewith, the computer readable program code including computer readable program code configured to arrange multiple servers coupled to a network as a software defined storage (SDS) grid, computer readable program code executing on a first given server and configured to receive an input/output (I/O) request, and computer readable program code configured, upon identifying that a second given server is arranged to process the I/O request, to forward the I/O request to the second server.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
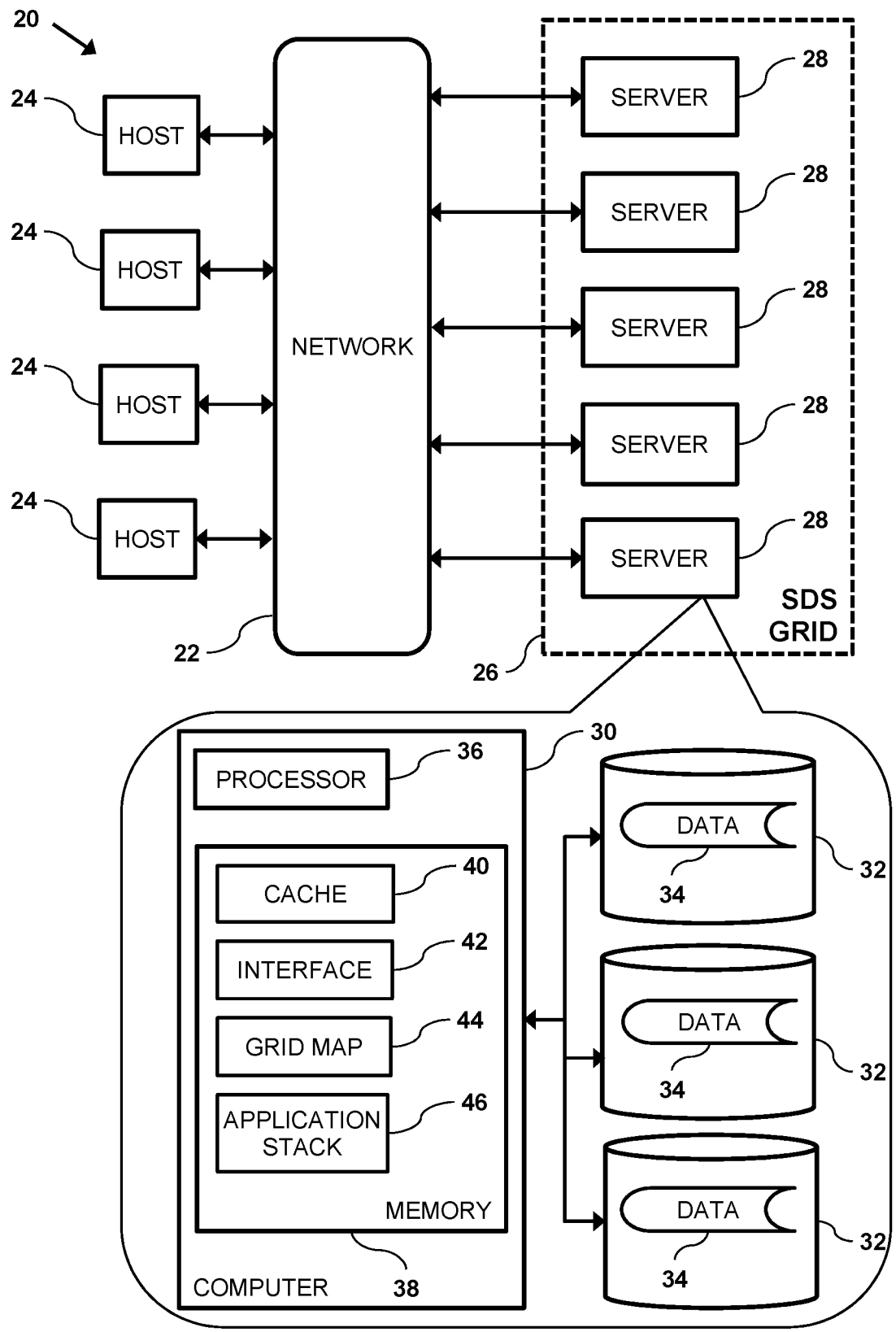
FIG. 1 is a block diagram that schematically illustrates a data facility comprising a software defined storage grid distributed across multiple servers, in accordance with an embodiment of the present invention.

When accessing a software defined storage (SDS) grid comprising multiple servers, a host computer typically installs client software in order to be able to access the SDS grid. The client software maps the distribution of data on the SDS grid, and directs input/output (I/O) requests to a given server storing the data. Servers storing data for an SDS grid are also referred to herein as grid nodes. The client software typically includes a grid data map, which is used to direct data between the host and the relevant grid node.

Embodiments of the present invention provide systems and methods for storing grid data maps in the SDS grid, thereby enabling host computers to use standard storage protocols such as iSCSI to access data in the SDS grid. By enabling the use of standard storage protocols, embodiments of the present invention can eliminate any need for host computers to execute specialized kernel driver and/or client software in order to access data in the SDS grid.

As described hereinbelow, multiple servers are configured as an SDS grid, the servers being coupled to a network that also includes one or more host computers. Upon a first given server receiving an input/output (I/O) request from a given host computer and identifying that a second given server is configured to process the I/O request, the first given server can forward the I/O request to the second server for processing. Upon receiving a result of the I/O request from the second given server, the first given server can forward the result to the given host computer.

In a first embodiment, each of the servers can maintain a local copy of a data grid data map. Therefore, by accessing the respective local grid data map, the first given server can identify that the second given server is configured to process the I/O request. For example, the I/O request may comprise a read request for data stored on the second given server, and upon identifying, in the local grid data map, that the second given server stores the requested data, the first given server can forward the read request to the second given server.

In a second embodiment, the first given server can perform a calculation that identifies the second given storage system based on information included in the I/O request. For example, if the I/O request includes a logical block address (LBA), the calculation may comprise an algorithm that uses the LBA as an input parameter, and the result of the calculation can indicate the second given server. In additional embodiments, the first given server can use the local grid data map in conjunction with a calculation in order to identify the second given server.

Therefore, in systems implementing embodiments of the present invention, the given host computer does not need to have access to the grid data map. In operation, data can span across multiple SDS grid nodes, and each of the grid nodes in the SDS grid can function as proxies to all the other grid nodes in the SDS grid. Additionally, by enabling the first given server to identify the second given server upon receiving the I/O request, SDS grids implementing embodiments of the present invention enable any host computer to easily access data in the SDS grid regardless of the hardware and software (i.e., operating system and virtual machine) configuration of the host computer.

FIG. 1 is a block diagram that schematically illustrates a data facility 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Facility 20 comprises a network 22 that couples host computers 24 to an SDS grid 26 that comprises multiple servers 28. While the configuration in FIG. 1 shows servers 28 at a single site coupled to a single network 22, SDS grid 26 may comprise servers at multiple sites that communicate over multiple interconnected physical and/or virtual networks.

Each server 28 comprises computer 30 and more storage devices 32 that store data 34. Each computer 30 comprises a processor 36 and a memory 38 that stores a cache 40, an interface 42, a grid data map 44, and an application stack 46. As described hereinbelow, processor 36 uses cache 40, interface 42, and grid data map 44 to process I/O requests for data stores in SDS grid 26. In embodiments of the present invention, in addition to processing I/O requests from host computers for data 34, servers 28 in SDS grid 26 can also execute application stack 46. Examples of application stack 46 include, but are not limited to, database servers, web servers and email servers.

Storage devices 32 comprise multiple slow and/or fast access time mass storage devices, herein below assumed to be multiple hard disks. FIG. 1 shows cache 40 coupled to a set of storage devices 32. In some configurations, storage devices 32 comprise one or more hard disks, or solid state drives (SSDs) which can have different performance characteristics. In response to an I/O command, a given cache 40, by way of example, may read or write data at addressable physical locations of a given storage device 32. In the embodiment shown in FIG. 1, cache 40 is able to exercise certain control functions over storage devices 32. These control functions may alternatively be realized by hardware devices such as disk controllers (not shown), which are linked to cache 40.

In some embodiments each of storage devices 32 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Interface 42 comprises a software application that is executed by processor 36 and is configured to receive and process I/O requests from host computers 24. Upon receiving an I/O request from a given host computer 24, interface 42 accesses grid data map 44 in order to identify a given server 28 that is configured to process the I/O request. Grid data map 44 comprises multiple entries, each of the entries comprising a data identifier and a server identifier. To identify the given server 28 that is configured to process the I/O request, interface 42 locates a given entry in grid data map 44 whose data identifier matches the data request, and retrieves the respective server identifier in the given entry, wherein the respective server identifier indicates the given server. In some embodiments, a given I/O request may comprise multiple data requests.

For example, if interface 42 in a first given server 28 receives an I/O request comprising a request to read data from a logical block address (LBA), the interface can locate a given entry in grid data map 44 whose data identifier includes the LBA, and retrieve, from the given entry, the server identifier that indicates a second given server 28. Interface 36 forwards a data request for the LBA to the second given server, and upon receiving the requested data from the second given server, the interface forwards the received data (i.e., a result of the data request) to the given host computer.

Figure 2A:
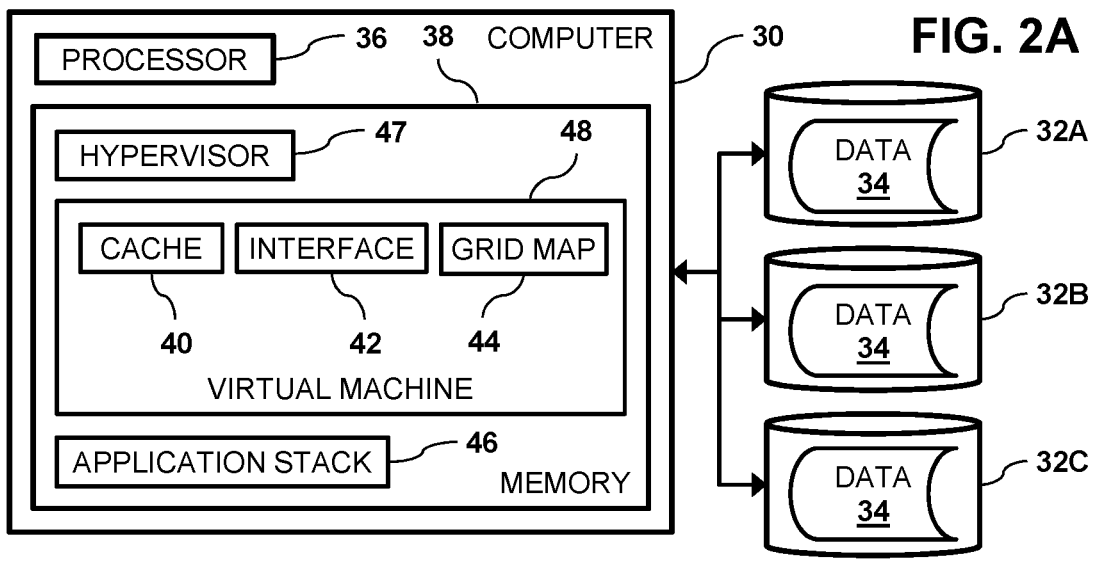
FIGS. 2A-2C are block diagrams that schematically illustrate different storage configurations of the servers, in accordance with an embodiment of the present invention.
Figure 2B:
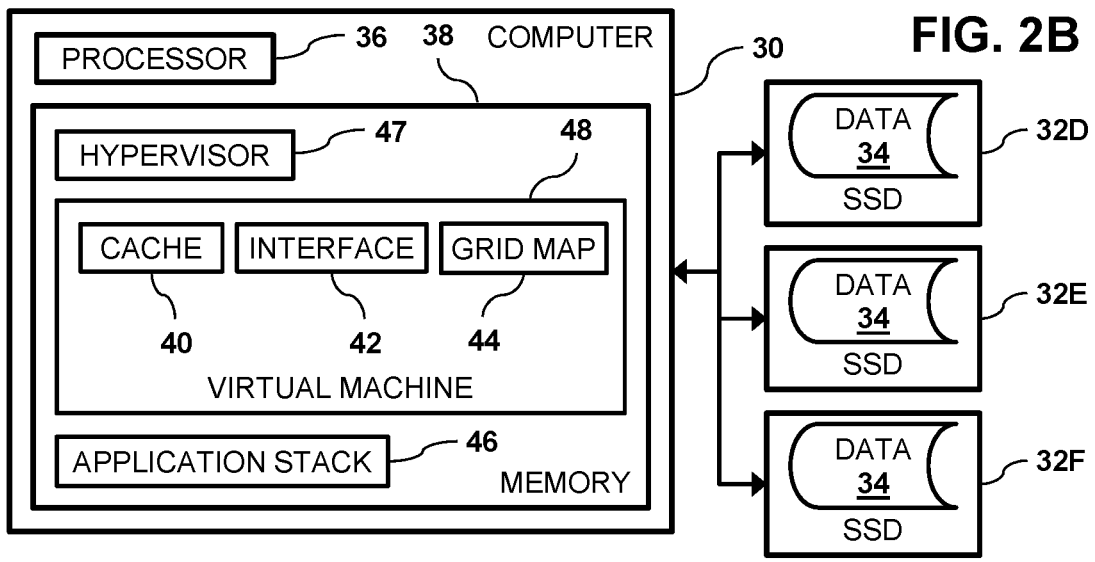
Figure 2C:
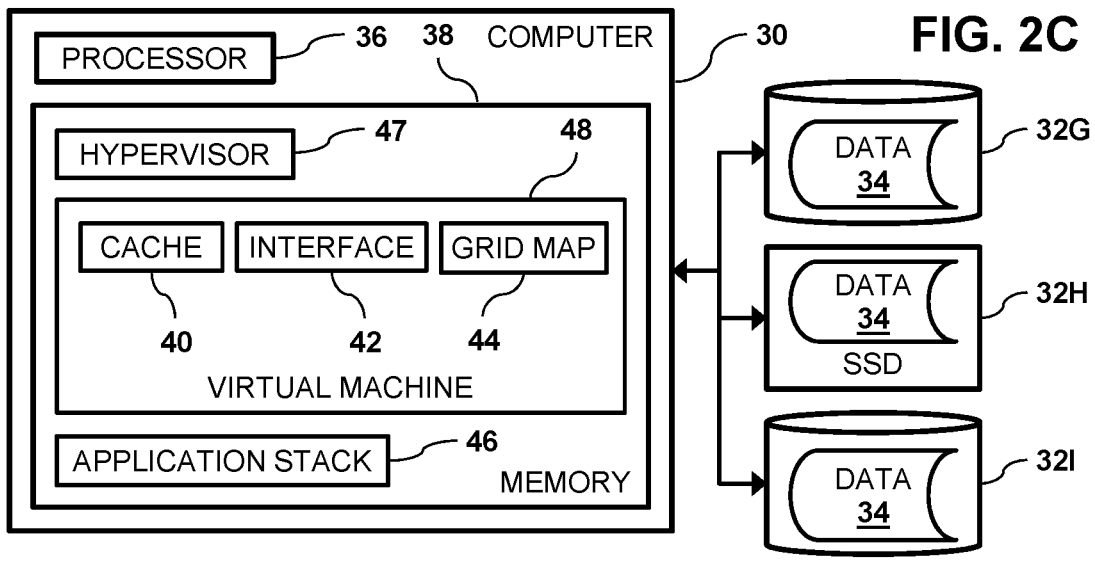

FIGS. 2A-2C are block diagrams that schematically illustrate different configurations of servers 28, in accordance with an embodiment of the present invention. In the examples shown in FIGS. 2A-2C, memory 38 comprises a volatile memory module (e.g., RDRAM), and processor 36 executes a hypervisor 47 from the volatile memory, thereby enabling the processor to execute interface 42 (and store cache 40 and grid data map 44) in a virtual machine instance 48. In embodiments where processors 36 implement virtual machines 48, facility 20 can implement SDS grid 26 in a distributed set of the virtual machines.

In FIGS. 2A-2C, storage devices 32 can be differentiated by appending a letter to the identifying numeral, so that the storage devices comprise storage devices 32A-32I. In the example shown in FIG. 2A, storage devices 32A-32C comprise hard disks. In the example shown in FIG. 2B, storage devices 34D-32F comprise solid state disks (SSDs). In the example shown in FIG. 2C, storage devices 32G and 32H comprise SSDs, and storage device 32I comprises a hard disk. Therefore, in embodiments of the present invention, storage devices in each server 32 may comprise any combination of hard disks and/or SSDs.

Processors 34 comprise general-purpose central processing units (CPU) or special-purpose embedded processors, which are programmed in software or firmware to carry out the functions described herein. The software may be downloaded to computers 30 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

USING SERVER BASED GRID DATA MAPS

Figure 3:
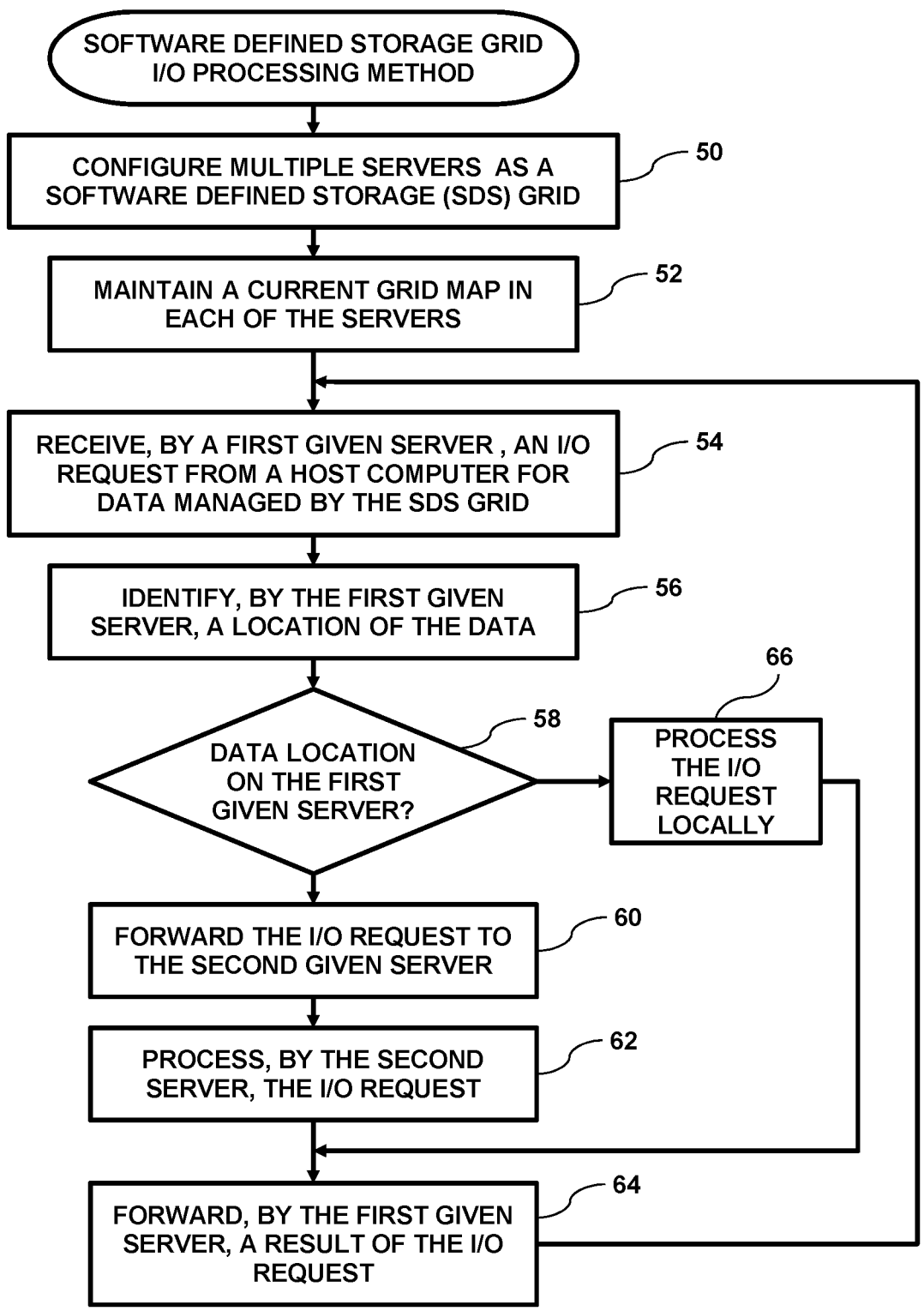
FIG. 3 is a flow diagram that schematically illustrates a method of processing input/output operations in the software defined storage grid, in accordance with an embodiment of the preset invention.

FIG. 3 is a flow diagram that schematically illustrates a method of processing input/output operations in SDS grid 26, in accordance with an embodiment of the preset invention. In a configuration step 50, servers 28 are configured as SDS grid 26, and in a maintenance step 52, processor 36 maintains respective grid data maps 44 in each of the servers. In some embodiments, processor 36 can execute step 50 as a standalone process that continually monitors how data is stored in SDS grid 26, and updates grid data map 44 accordingly.

In a receive step 54, processor 36 in a first given server (also referred to herein as a receiving server 28) receives, from a given host computer 24, an I/O request for data managed by SDS grid 26. Examples of I/O requests include, but are not limited to requests to read data from one or more specific locations in storage devices 32 SDS grid 26, or requests to write data to the one or more specific locations in the storage devices in the SDS grid. While the I/O request may comprise data stored in multiple locations in SDS grid 26, for purposes of simplicity, the I/O request described in the flow diagram comprises data stored in a single location.

In an identification step 56, processor 36 identifies a location for the data indicated by the I/O request. As described supra, processor 36 can use grid data map 44 to identify the location. Alternatively, processor 36 can use an algorithm (i.e., a computation) or a combination of grid data map 44 and an algorithm to identify the location in SDS grid 26.

In some embodiments the identified location may comprise a given server 28. In embodiments where SDS grid 26 comprises multiple physical and/or logical groups of servers 28, the identified location may comprise a given group. For purposes of simplicity, the location identified in the flow diagram comprises a single given server 28.

In a comparison step 58, if the identified location is on a second given server 28 (i.e., different from the receiving server), then in a first forwarding step 60, processor 36 forwards the I/O request to the second given server. In a remote processing step 62, the second given server processes the forwarded I/O request, and conveys a result of the processed I/O request to the first given server. In a second forwarding step 64, processor 36 forwards the result of the processed I/O request to the given host computer, and the method continues with step 54.

Returning to step 58, if the location is on the first given server, then processor 36 in the first given server processes the I/O request locally, and the method continues with step 64.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring multiple servers coupled to a network as a software defined storage (SDS) grid, the SDS grid comprising the multiple servers storing a grid data map of a data distribution among the multiple servers of the SDS grid; wherein the grid data map stores a plurality of entries, each of the plurality of entries including a data identifier and a server identifier;
receiving, by a first given server of the SDS grid, an input/output (I/O) request from a host computer via the network; wherein the host computer connects to the SDS grid over a standard Internet Small Computer Systems Interface (iSCSI) protocol such that the host computer does not execute a specialized kernel driver nor client software to access data stored within the SDS grid; and wherein the host computer does not have access to the grid data map indicating the data distribution of the data stored among the multiple servers of the SDS grid; and
upon identifying that a second given server of the SDS grid is configured to process the I/O request, forwarding the I/O request to the second given server; wherein identifying the second given server comprises performing, by the first given server, a calculation comprising an algorithm that uses a Logical Block Address (LBA) received with the I/O request such that the LBA is used as an input parameter to the calculation, and wherein a result of the calculation, when used in conjunction with the grid data map, indicates the second given server by locating a given one of the plurality of entries in the grid data map which matches the data identifier according to the result of the calculation and retrieving the server identifier associated with the second given server.

2. The method according to claim 1, and comprising receiving, by the first given server from the second given server, a result of the I/O request, and forwarding the result to the host computer.

3. The method according to claim 2, wherein forwarding the I/O request comprises forwarding a data request to the second given server, and wherein the result of the I/O request comprises a result of the data request.

4. The method according to claim 3, wherein identifying the second given server comprises locating a given entry whose data identifier matches the data request, and wherein the respective server identifier in the given entry indicates the second given server.

5. A data facility, comprising:
a network;
one or more host computers coupled to the network; and
multiple servers coupled to the network, and configured as a software defined storage (SDS) grid, the SDS grid comprising the multiple servers storing a grid data map of a data distribution among the multiple servers of the SDS grid; wherein the grid data map stores a plurality of entries, each of the plurality of entries including a data identifier and a server identifier, each of the servers comprising:
multiple storage devices, and
a processor configured:
to receive at a receiving server of the SDS grid, from a given host computer, an input/output (I/O) request; wherein the host computer connects to the SDS grid over a standard Internet Small Computer Systems Interface (iSCSI) protocol such that the host computer does not execute a specialized kernel driver nor client software to access data stored within the SDS grid; and wherein the host computer does not have access to the grid data map indicating the data distribution of the data stored among the multiple servers of the SDS grid, and
upon identifying that a given server of the SDS grid, different from the receiving server is configured to process the I/O request, to forward the I/O request to the given server; wherein identifying the second given server comprises performing, by the first given server, a calculation comprising an algorithm that uses a Logical Block Address (LBA) received with the I/O request such that the LBA is used as an input parameter to the calculation, and wherein a result of the calculation, when used in conjunction with the grid data map, indicates the second given server by locating a given one of the plurality of entries in the grid data map which matches the data identifier according to the result of the calculation and retrieving the server identifier associated with the second given server.

6. The data facility according to claim 5, wherein the processor is configured to receive, from the given server, a result of the I/O request, and to forward the result to the given host computer.

7. The data facility according to claim 6, wherein the processor is configured to forward the I/O request by forwarding a data request to the second given server, and wherein the result of the I/O request comprises a result of the data request.

8. The data facility according to claim 7, wherein the processor is configured to identify the second given server by locating a given entry whose data identifier matches the data request, and wherein the respective server identifier in the given entry indicates the second given server.

9. A computer program product, the computer program product comprising:
   a non-transitory computer readable storage medium having computer readable program code embodied therewith, the computer readable program code comprising:
   computer readable program code configured to arrange multiple servers coupled to a network as a software defined storage (SDS) grid, the SDS grid comprising the multiple servers storing a grid data map of a data distribution among the multiple servers of the SDS grid; wherein the grid data map stores a plurality of entries, each of the plurality of entries including a data identifier and a server identifier;
   computer readable program code executing on a first given server of the SDS grid and configured to receive an input/output (I/O) request from a host computer via the network; wherein the host computer does connects to the SDS grid over a standard Internet Small Computer Systems Interface (iSCSI) protocol such that the host computer does not execute a specialized kernel driver nor client software to access data stored within the SDS grid; and wherein the host computer not have access to the grid data map indicating the data distribution of the data stored among the multiple servers of the SDS grid; and
   computer readable program code configured, upon identifying that a second given server of the SDS grid is arranged to process the I/O request, to forward the I/O request to the second server; wherein identifying the second given server comprises performing, by the first given server, a calculation comprising an algorithm that uses a Logical Block Address (LBA) received with the I/O request such that the LBA is used as an input parameter to the calculation, and wherein a result of the calculation, when used in conjunction with the grid data map, indicates the second given server by locating a given one of the plurality of entries in the grid data map which matches the data identifier according to the result of the calculation and retrieving the server identifier associated with the second given server.

10. The computer program product according to claim 9, and comprising computer readable program code executing on the first given server and configured to receive, from the second given server, a result of the I/O request, and to forward the result to the host computer.

11. The computer program product according to claim 10, wherein the computer readable program code is configured to forward the I/O request by forwarding a data request to the second given server, and wherein the result of the I/O request comprises a result of the data request.

12. The computer program product according to claim 11, wherein the computer readable program code is configured identify the second given server by locating a given entry whose data identifier matches the data request, and wherein the respective server identifier in the given entry indicates the second given server.

* * * * *